United States Patent
Gonring

(10) Patent No.: US 12,113,225 B2
(45) Date of Patent: *Oct. 8, 2024

(54) WATERTIGHT MARINE BATTERY

(71) Applicant: Brunswick Corporation, Mettawa, IL (US)

(72) Inventor: Steven J. Gonring, Slinger, WI (US)

(73) Assignee: Brunswick Corporation, Mettawa, IL (US)

( * ) Notice: Subject to any disclaimer, the term of this patent is extended or adjusted under 35 U.S.C. 154(b) by 25 days.

This patent is subject to a terminal disclaimer.

(21) Appl. No.: 17/383,979

(22) Filed: Jul. 23, 2021

(65) Prior Publication Data

US 2022/0328912 A1  Oct. 13, 2022

Related U.S. Application Data

(60) Provisional application No. 63/172,895, filed on Apr. 9, 2021.

(51) Int. Cl.
| | |
|---|---|
| *H01M 50/141* | (2021.01) |
| *H01M 10/42* | (2006.01) |
| *H01M 10/48* | (2006.01) |
| *H01M 50/342* | (2021.01) |

(52) U.S. Cl.
CPC ......... *H01M 50/141* (2021.01); *H01M 10/42* (2013.01); *H01M 10/486* (2013.01); *H01M 50/3425* (2021.01); *H01M 2220/20* (2013.01)

(58) Field of Classification Search
CPC .......... H01M 50/141; H01M 50/3425; H01M 50/342; H01M 50/308; H01M 50/333; H01M 50/394; H01M 50/202; H01M 50/242; H01M 10/42; H01M 10/486; H01M 10/52; H01M 10/0525; H01M 4/133; H01M 4/583; H01M 2220/20
See application file for complete search history.

(56) References Cited

U.S. PATENT DOCUMENTS

| | | | |
|---|---|---|---|
| 5,876,872 | A | 3/1999 | Feezor |
| 8,980,455 | B2 | 3/2015 | Guo |
| 9,099,760 | B2 | 8/2015 | Lim et al. |

(Continued)

FOREIGN PATENT DOCUMENTS

| | | |
|---|---|---|
| CN | 109860503 | 6/2019 |
| CN | 212695242 | 3/2021 |
| DE | 102014006829 | 11/2015 |

OTHER PUBLICATIONS

Extended European Search Report issued in Corresponding European Patent Application No. 22167245.4, dated Oct. 11, 2022.

*Primary Examiner* — Matthew T Martin
*Assistant Examiner* — Adam J Francis
(74) *Attorney, Agent, or Firm* — Andrus Intellectual Property Law, LLP

(57) ABSTRACT

A marine battery system configured to provide energy to a marine vessel load is provided. The marine battery system includes a main enclosure body and an auxiliary enclosure body that is detachably coupled to the main enclosure body to define a sealed battery volume. The auxiliary enclosure body is configured to perform a pressure accommodation action responsive to an increase in a temperature within the sealed battery volume. The marine battery system further includes a battery disposed within the sealed battery volume.

16 Claims, 7 Drawing Sheets

(56) References Cited

U.S. PATENT DOCUMENTS

| | | |
|---|---|---|
| 9,153,800 B2 | 10/2015 | Jung |
| 9,630,686 B2 | 4/2017 | Morash et al. |
| 9,853,267 B2 | 12/2017 | Page et al. |
| 10,096,863 B2 | 10/2018 | Hartmeyer et al. |
| 10,622,682 B2 | 4/2020 | Brockman et al. |
| 10,777,856 B2* | 9/2020 | Stachewicz ............ B60L 3/0007 |
| 10,804,711 B2 | 10/2020 | Sheeks et al. |
| 10,818,978 B2 | 10/2020 | Newman et al. |
| 10,862,087 B2 | 12/2020 | Hartmeyer |
| 10,991,923 B2 | 4/2021 | Cordani |
| 11,011,736 B2 | 5/2021 | Mack et al. |
| 2011/0045324 A1* | 2/2011 | Kritzer ................. H01M 6/5011 |
| | | 429/57 |
| 2012/0244393 A1* | 9/2012 | Stanek ................ H01M 10/613 |
| | | 429/50 |
| 2012/0315514 A1 | 12/2012 | Guo |
| 2013/0164567 A1 | 6/2013 | Olsson et al. |
| 2014/0242423 A1* | 8/2014 | Jones ................. H01M 50/3425 |
| | | 429/50 |
| 2015/0380782 A1* | 12/2015 | Youngs ............... H01M 10/613 |
| | | 429/72 |
| 2017/0253142 A1* | 9/2017 | Buckhout ............ H01M 10/486 |
| 2017/0267319 A1* | 9/2017 | Morash ................. G01S 15/104 |
| 2018/0013115 A1 | 1/2018 | Schmidtke |
| 2018/0062210 A1* | 3/2018 | Kim .................... H01M 10/484 |
| 2018/0219266 A1 | 8/2018 | Hermann |
| 2019/0168038 A1 | 6/2019 | Lian et al. |
| 2020/0149989 A1 | 5/2020 | Jost et al. |
| 2020/0251703 A1* | 8/2020 | Aldrich ............... H01M 50/383 |
| 2020/0266508 A1 | 8/2020 | Hjorteset |
| 2020/0335833 A1* | 10/2020 | Schmidt ............ H01M 10/4228 |
| 2020/0377186 A1 | 12/2020 | Thompson |

\* cited by examiner

WATERTIGHT MARINE BATTERY

CROSS-REFERENCE TO RELATED APPLICATION

The present application claims priority to and the benefit of U.S. Provisional Application Ser. No. 63/172,895, filed Apr. 9, 2021, which is hereby incorporated by reference herein in its entirety.

FIELD

The present disclosure relates to battery systems for marine vessels, and particularly to systems and methods for detecting and mitigating adverse marine battery conditions.

BACKGROUND

U.S. Pat. No. 9,630,686 discloses a pressure tolerant energy system. The pressure tolerant energy system may comprise a pressure tolerant cavity and an energy system enclosed in the pressure tolerant cavity configured to provide electrical power to the vessel. The energy system may include one or more battery cells and a pressure tolerant, programmable management circuit. The pressure tolerant cavity may be filled with an electrically-inert liquid, such as mineral oil. In some embodiments, the electrically-inert liquid may be kept at a positive pressure relative to a pressure external to the pressure tolerant cavity. The energy system may further comprise a pressure venting system configured to maintain the pressure inside the pressure tolerant cavity within a range of pressures. The pressure tolerant cavity may be sealed to prevent water ingress.

U.S. Pat. No. 8,980,455 discloses a lithium-ion battery with a gas-releasing and explosion-proof safety valve, which comprises a casing and a battery core. The casing includes an opening that is sealed by a thermal cover, on which a safety valve is disposed. The safety valve comprises a safety cover and a pressure filter. A middle portion of the safety cover includes a through hole. The pressure filter is affixed to the middle portion of the safety cover and has numerous pores. The safety cover and thermal cover are hooked together. The present invention offers multiple advantages. Firstly, simplified structure without aging issue enhances the safety and reliability of the battery. Secondly, during operation, gas is ventilated when an internal pressure of the battery reaches a certain threshold value to avoid rupture of the battery casing. Thirdly, with enhanced performance of the battery, the cycle life of the battery is greatly increased.

U.S. Patent Application No. 2018/0013115 discloses a method for housing a battery used on a light-weight, motor powered watercraft includes the step of: providing a battery case having: a pod sized to house a marine battery, the pod having a cavity for the marine battery and an open top; a lid for at least water-resistant closure of the open top of the pod, the lid having a cavity and an open bottom, the lid is releasably attachable to the pod; and a floor releasably attached to the lid adjacent the open bottom, the floor adapted to hold controls for the light-weight, motor powered watercraft.

The above patents and patent publications are hereby incorporated by reference in their entireties.

SUMMARY

This Summary is provided to introduce a selection of concepts that are further described hereinbelow in the Detailed Description. This Summary is not intended to identify key or essential features of the claimed subject matter, nor is it intended to be used as an aid in limiting the scope of the claimed subject matter.

According to one implementation of the present disclosure, a marine battery system configured to provide energy to a marine vessel load is provided. The marine battery system includes a main enclosure body and an auxiliary enclosure body that is detachably coupled to the main enclosure body to define a sealed battery volume. The auxiliary enclosure body is configured to perform a pressure accommodation action responsive to an increase in temperature within the sealed battery volume.

According to another implementation of the present disclosure, a marine battery system for a marine vessel is provided. The marine battery system includes a battery, a main enclosure body, an auxiliary enclosure body that is detachably coupled to the main enclosure body, and a bladder that is disposed within the main enclosure body and the auxiliary enclosure body. The battery is fully encapsulated by the main enclosure body and the bladder within a sealed battery volume. An increase in a temperature within the sealed battery volume causes the bladder to expand within the auxiliary enclosure body to compensate for an increase in a pressure within the sealed battery volume.

According to another implementation of the present disclosure, a marine battery system for a marine vessel is provided. The marine battery system includes a battery, a main enclosure body, an auxiliary enclosure body that is detachably coupled to the main enclosure body, and a piston disposed within the auxiliary enclosure body. The battery is fully encapsulated by the main enclosure body and the auxiliary enclosure body within a sealed battery volume, and an increase in a temperature within the sealed battery volume causes the piston to slide within the auxiliary enclosure body and expand the sealed battery volume to compensate for an increase in a pressure within the sealed battery volume.

According to yet another implementation of the present disclosure, a method for operating a marine battery configured to provide energy to a marine vessel load is provided. The method includes receiving, at a battery management system for the marine battery, pressure information from a pressure sensor located in a sealed battery volume within a battery enclosure for the marine battery. The battery enclosure includes a main enclosure body and an auxiliary enclosure body. The method further includes receiving temperature information from a temperature sensor located in the sealed battery volume, comparing the pressure information and the temperature information, and determining whether an enclosure breach in the sealed battery volume has occurred based on a comparison of the pressure information and the temperature information.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clearness and understanding. No unnecessary limitations are to be inferred therefrom beyond the requirement of the prior art because such terms are used for descriptive purposes only and are intended to be broadly construed.

Vessel electrification and the application of electric propulsion systems and Lithium Ion battery technology for electrical energy storage creates a different set of hazards than traditional internal combustion engines and liquid fuel storage. Additional hazards are created when current technology Lithium Ion (Li-ion) batteries with liquid organic electrolyte come in contact with water. The inventor has recognized that particular issues may arise relating to battery conditions on marine vessels and other marine-related electrical energy storage with current technology lithium ion batteries because boaters may be on open water and/or not be able to reach a safe location in event of a battery fire or other hazardous battery event. In addition, Li-ion batteries in marine applications are at particular risk because the humid and salty environments are not conducive to long battery life. Thus, the inventor has recognized a need for a marine battery system with sealed battery compartments and monitoring methods that provide detection and mitigation of potential hazards of a battery electric drive system in a marine application. The innovative concepts are applicable to broad range of battery applications beyond the marine industry.

Figure 1:
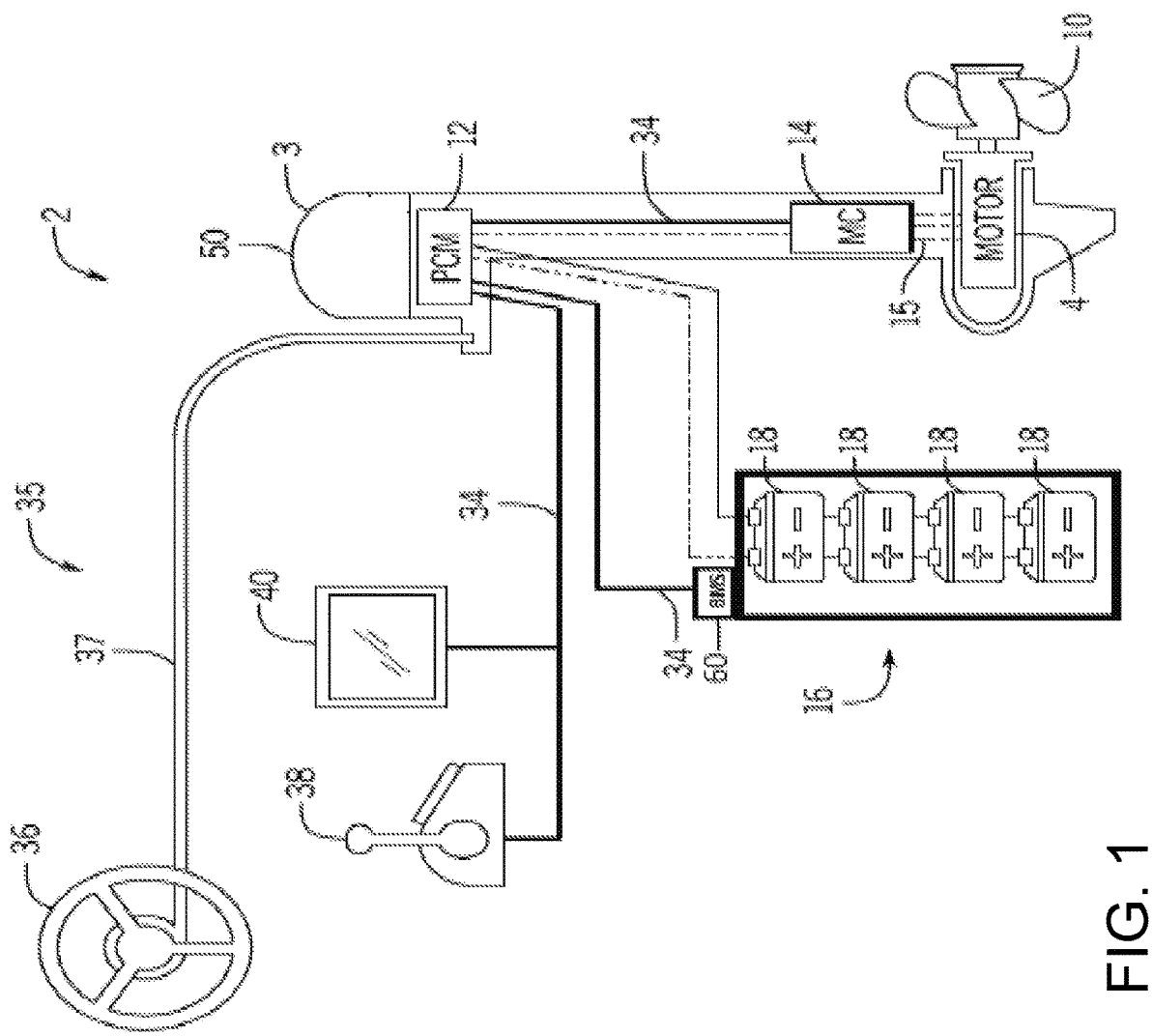
FIG. 1 is a block diagram illustrating a marine vessel including an electric marine propulsion system according to an exemplary implementation of the present disclosure.

FIG. 1 depicts an embodiment of an electric marine propulsion system 2 powered by a storage system 16, such as a Li-ion battery pack. In the depicted embodiment, the electric marine propulsion system 2 includes an outboard marine drive 3 having an electric motor 4 housed therein, such as housed within the cowl 50 of the outboard marine drive. A person of ordinary skill in the art will understand in view of the present disclosure that the marine propulsion system 2 may include other types of electric marine drives, such as inboard drives or stern drives. The electric marine drive 3 has an electric motor 4 configured to propel the marine vessel 1 by rotating a propeller 10. The motor 4 may be, for example, a brushless electric motor, such as a brushless DC motor. In other embodiments, the electric motor may be a DC brushed motor, an AC brushless motor, a direct drive, a permanent magnet synchronous motor, an induction motor, or any other device that converts electric power to rotational motion. In certain embodiments, the electric motor 4 includes a rotor and a stator, as is well known in the relevant art.

The electric motor 4 is electrically connected to and powered by a power storage system 16. The power storage system 16 stores energy for powering the electric motor 4 and is rechargeable, such as by connection to shore power when the electric motor 4 is not in use. Various power storage systems 16 are known in the art and are suitable for powering an electric marine drive, such as various Li-ion battery pack arrangements. In the depicted example, a bank or group of cell modules 18 is connected in series to provide a large voltage output. For example, the battery system may include multiple cell modules 18, such as 4-7 cell modules, each being a 50 V storage unit, which may be arranged in series to provide a high voltage output. Each cell module 18, or storage section, is comprised of multiple battery cells.

The power storage system 16 may further include a battery management system (BMS) 60 configured to monitor and/or control aspects of the power storage system 16. For example, the BMS 60 may receive inputs from one or more sensors within or on the power storage system 16, such as an integrated management module (IMM), one or more temperature sensors configured to sense temperature at location(s) within the battery pack enclosures (see FIGS. 2-4), one or more pack internal pressure sensors configured to sense pressure at location(s) within the enclosure, a water sensor configured to sense water ingress or to sense water on the exterior of the enclosure, a humidity sensor configured to sense humidity within the enclosure, and electrolysis gas sensors configured to sense the presence of gas (e.g., hydrogen gas) indicating that electrolysis is occurring. The system is configured to determine a battery state of health and to recognize a hazardous condition based on any one or more of the sensor measurements. The BMS 60 may further be configured to receive information from current, voltage, and/or other sensors within the power storage system 16, such as to receive information about the voltage, current, and temperature of each battery cell and/or each cell module 18 within the power storage system 16.

The central controller 12, which in the depicted embodiment is a propulsion control module (PCM), communicates with the motor controller 14 via communication link 34, such as a CAN bus. The controller also receives input from and/or communicates with one or more user interface devices in a user interface system 35 via the communication link, which in some embodiments may be the same communication link as utilized for communication between the controllers 12, 14, 20 or may be a separate communication link. The user interface devices in the exemplary embodiment include a throttle lever 38 and a display 40. In various embodiments, the display 40 may be, for example, part of an onboard management system, such as the VesselView™ by Mercury Marine of Fond du Lac, Wisconsin. The user interface system 35 may also include a steering wheel 36, which in some embodiments may also communicate with the controller 12 in order to effectuate steering control over the marine drive 3, which is well-known and typically referred to as steer-by-wire arrangements. In the depicted embodiment, the steering wheel 36 is a manual steer arrangement where the steering wheel 36 is connected to a steering actuator that steers the marine drive 3 by a steering cable 37.

Each electric motor 4 may be associated with a motor controller 14 configured to control power to the electric motor, such as to the stator winding thereof. The motor controller 14 is configured to control the function and output of the electric motor 4, such as controlling the torque outputted by the motor, the rotational speed and direction of the motor 4, as well as the input current, voltage, and power supplied to and utilized by the motor 4. In one arrangement, the motor controller 14 controls the current delivered to the stator windings via the leads 15, which input electrical energy to the electric motor to induce and control rotation of the rotor. Sensors may be configured to sense the power, including the current and voltage, delivered to the motor 4. The motor controller 14 is configured to provide appropriate current and or voltage to meet the demand for controlling the motor 4. For example, a demand input may be received at the motor controller 14 from the central controller 12, such as based on an operator demand at a helm input device, such as the throttle lever 38.

Figure 2:
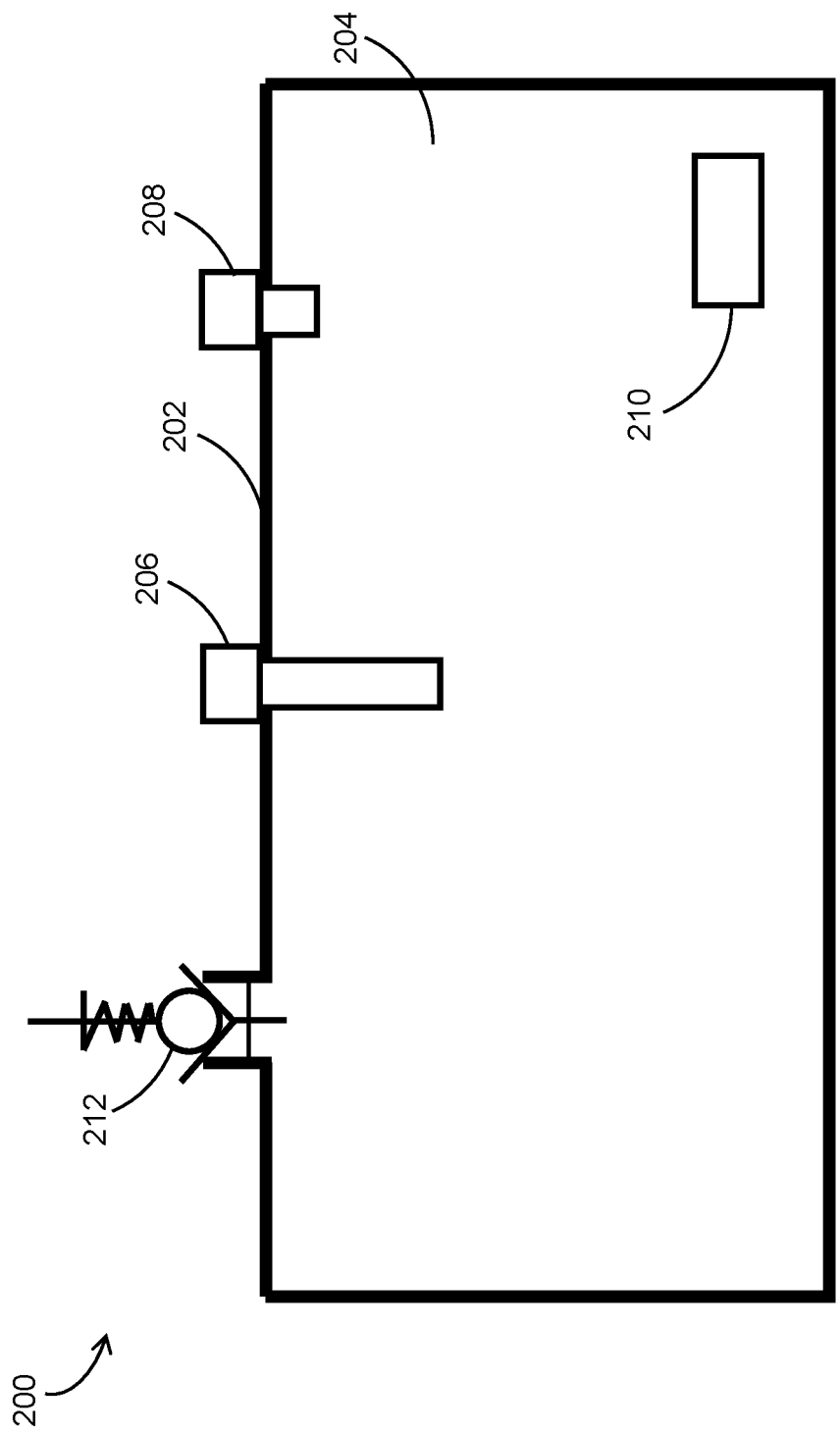
FIG. 2 is a block diagram illustrating a sealed battery enclosure that may be used in the electric marine propulsion system of FIG. 1.

Turning now to FIG. 2, a sealed battery enclosure 200 is depicted. The sealed battery enclosure 200 may be incorporated into any of the cell modules 18 depicted in FIG. 1. The sealed battery enclosure 200 is shown to include an enclosure body 202 that defines the boundaries for a sealed battery volume 204. In various embodiments, the enclosure body 202 may be fabricated from a metal (e.g., aluminum or aluminum alloy, steel), plastic, or composite material. The enclosure body 202 may further include various sealing gaskets and/or impermeable coatings in order to achieve a desired enclosure impermeability and provide a hermetic environment within the sealed battery volume 204.

A battery cell or cells (not shown) may be positioned within the sealed battery volume 204 and may include all the typical components of a battery cell, namely, a cathode, an anode, an electrolyte, and a separator. In an exemplary implementation, the battery cell includes intercalated lithium compound utilized as the cathodic material and graphite utilized as the anodic material.

A temperature sensor 206 and a pressure sensor 208 are shown to be coupled to an upper wall of the battery enclosure 200. The temperature sensor 206 is configured to detect temperature information (e.g., temperature measurements) within the sealed battery volume 204. The temperature sensor 206 may be any suitable type of temperature sensor (e.g., a thermocouple, a resistance temperature detector (RTD), a thermistor, a semiconductor-based integrated circuit) and is not particularly limited. The pressure sensor 208 is configured to detect pressure information (e.g., pressure measurements) within the sealed battery volume 204. The pressure sensor 208 may be any suitable type of pressure sensor and is not particularly limited. In an exemplary implementation, the pressure sensor 208 is configured to measure absolute pressure within the sealed battery volume 204. As described in further detail below with reference to FIGS. 5 and 6, the temperature sensor 206 and the pressure sensor 208 may be utilized in concert to detect breaches in the sealed battery volume 204.

The battery enclosure 200 is further shown to include a desiccant 210 located within the sealed enclosure volume 204. Although Li-ion batteries are generally manufactured in humidity-controlled settings, the presence of the desiccant 210 can ensure any water contamination introduced into the sealed enclosure volume 204 during the manufacturing process is absorbed and/or adsorbed. The desiccant 210 may be replaced any time the battery enclosure 200 is serviced or any time the sealed enclosure volume 204 is breached to remove any moisture that is introduced during these processes. The characteristics of the desiccant 210 are not particularly limited. For example, in various embodiments, the desiccant 210 may include silica gel, molecular sieves (zeolites), or activated alumina.

The battery enclosure 200 further includes a pressure relief valve 212. The pressure relief valve 212 is configured to remain closed under nominal conditions and to open to vent air from within the sealed enclosure volume 204 if a pressure safety threshold within the sealed enclosure volume 204 is exceeded to prevent catastrophic housing failure. In some implementations, the pressure relief valve 212 includes a membrane that permits air to flow through the pressure relief valve 212 when it is in the opened position, but does not permit water to enter the sealed enclosure volume 204 through the pressure relief valve 212. As described in further detail below with reference to FIG. 6, based on the pressure information received from the pressure sensor 208, the BMS 60 and/or the central controller 12 may be configured to detect if the pressure relief valve 212 is malfunctioning and to perform appropriate mitigation actions in the event of a detected malfunction.

Figure 3:
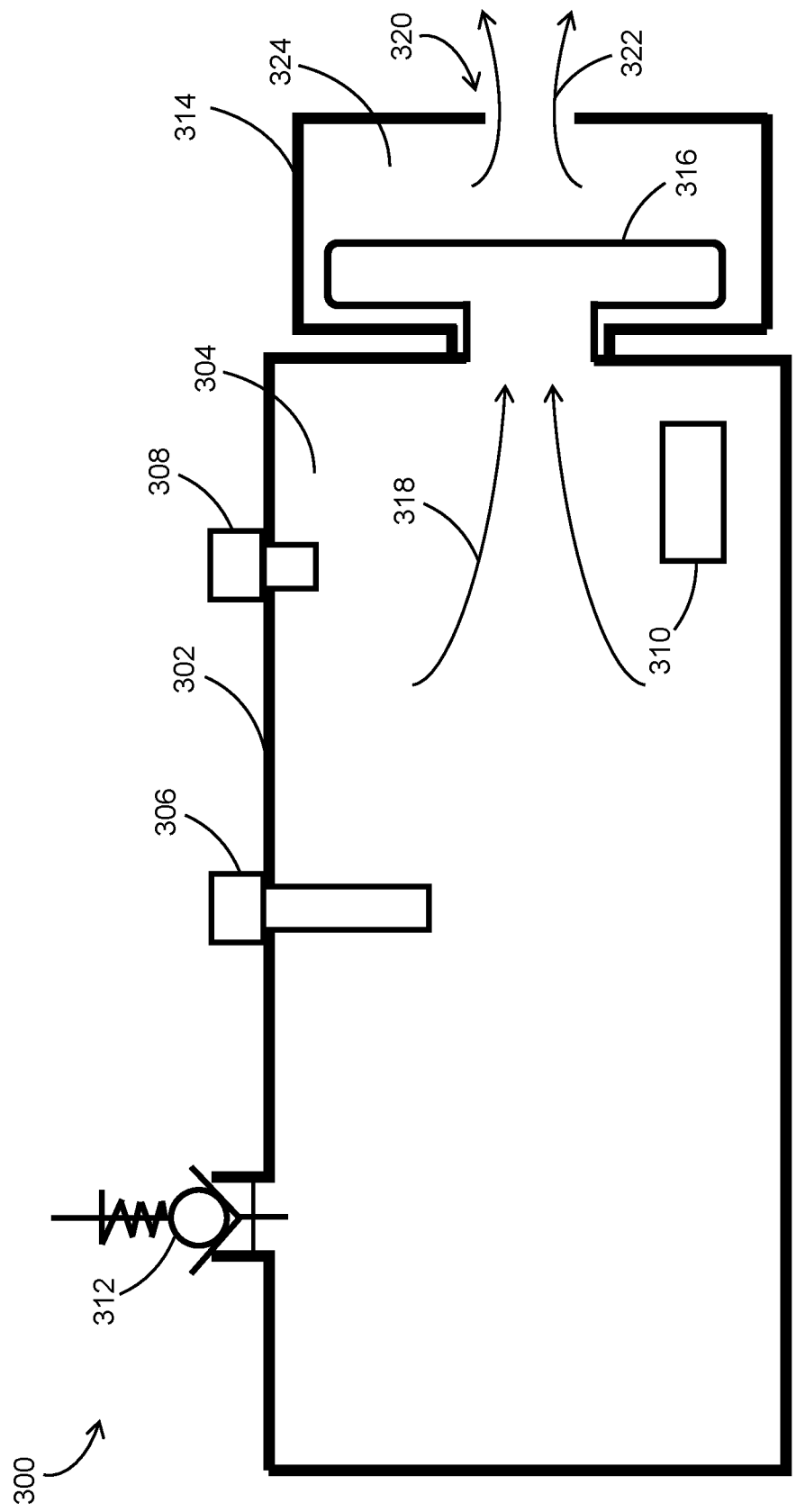
FIG. 3 is a block diagram illustrating a sealed battery enclosure with an expandable bladder that may be utilized in the electric marine propulsion system of FIG. 1.

Referring now to FIG. 3, a sealed battery enclosure 300 with an expandable bladder system is depicted. The sealed battery enclosure 300 may be incorporated into any of the cell modules 18 depicted in FIG. 1. In contrast to the enclosure 200 depicted in FIG. 2, the sealed battery enclosure 300 is shown to include both a main enclosure body 302 and an auxiliary enclosure body 314. The main enclosure body 302 defines a first battery volume 304, and the auxiliary enclosure body 314 defines a second battery volume 324. As described in further detail below, the maximum sealed volume available to a battery cell or cells disposed within the battery enclosure 300 is the sum of the first battery volume 304 and the second battery volume 324.

In an exemplary implementation, the auxiliary enclosure body 314 is detachably coupled to the main enclosure body 302. The coupling between the main and auxiliary enclosure bodies 302, 314 may be achieved using a suitable sealed coupling mechanism, for example, a threaded connection, male and female mating connectors with o-ring seals, etc. In some implementations, the auxiliary enclosure body 314 may not be directly coupled to the main enclosure body 302. Instead, the auxiliary enclosure body 314 may be located remotely from the main enclosure body 302, and the bodies 302, 314 may be connected by a tube or conduit. The present inventor has recognized that by permitting the auxiliary enclosure body 314 to be detached from the main enclosure body 302, the serviceability of the sealed battery enclosure 300 is improved. For example, if an enclosure breach occurs, the auxiliary enclosure body 314 may be detached from the main enclosure body 302 in order to service the battery. The auxiliary enclosure body 314 can also be replaced with a new or repaired auxiliary enclosure body 314. In this way, the battery system is serviceable and the lifespan of the sealed battery enclosure 300 may be extended.

An expandable bladder 316 is shown to be located at least partially within the auxiliary enclosure body 314. In various implementations, the bladder 316 may extend into the main enclosure body 302 such that the battery cells disposed within the sealed battery enclosure 300 are encapsulated by the main enclosure body 302 and the bladder 316. As shown in FIG. 3, prior to operation of the battery cells and/or when the battery enclosure 300 is located in a cold or moderate temperature environment, the bladder 316 may be deflated or only partially inflated. However, as the battery cells positioned within the main sealed battery volume 304 heat up due to operation of the cells or an increase in environmental temperature, electrolysis gas 318 builds up within the main enclosure body 302. This electrolysis gas 318 causes the bladder 316 to inflate within the auxiliary enclosure body 314, up to a maximum volume represented by the second battery volume 324. In other words, the bladder 316 may expand to substantially fill the entire volume 324 of the auxiliary enclosure body 314. As the bladder 316 inflates within the auxiliary enclosure body 314, the bladder 316 displaces air 322 located within the second battery volume 324, which is forced out of the enclosure body 314 through a vent opening 320. In an exemplary implementation, the vent opening 320 includes a membrane that permits air 322 to flow through the vent 320, but does not permit water to enter the auxiliary enclosure body 314.

The bladder 316 may be fabricated from any material that is sufficiently flexible to inflate due to the build up of electrolysis gas and sufficiently strong to resist failure due to breach.

The sealed battery enclosure 300 is further shown to include a temperature sensor 306, a pressure sensor 308, a desiccant 310, and a pressure relief valve 312. Each of these components may be identical or substantially similar to sensors 206, 208, desiccant 210, and pressure relief valve 212, depicted and described above with reference to FIG. 2. Although the desiccant 310 is shown to be positioned within the main enclosure body 302, in other implementations, the desiccant 310 may be located within the auxiliary enclosure body 314. In still further implementations, both the main enclosure body 302 and the auxiliary enclosure body 314 include a desiccant 310.

Figure 4:
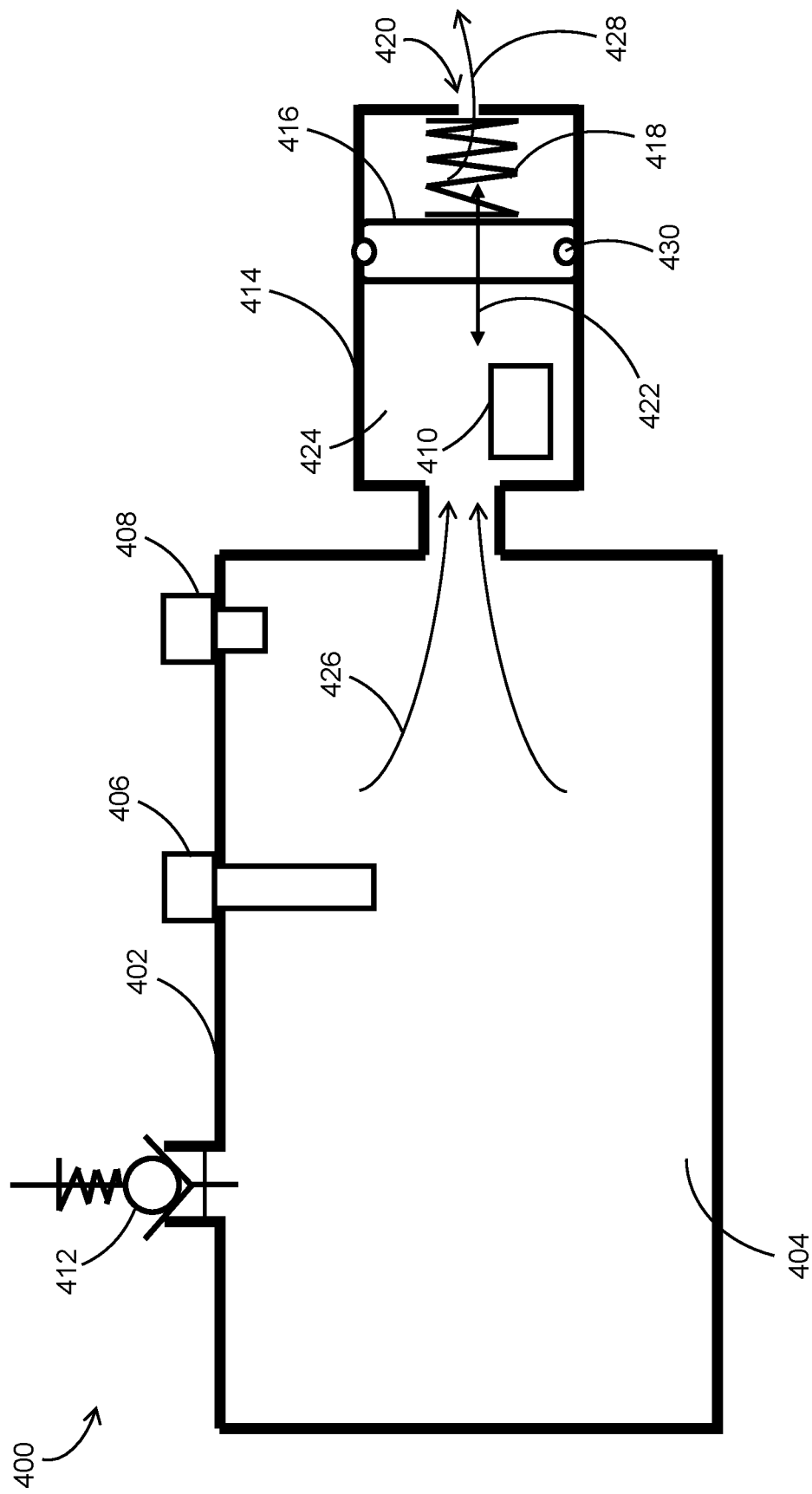
FIG. 4 is a block diagram illustrating a sealed battery enclosure with a piston assembly that may be utilized in the electric marine propulsion system of FIG. 1.

Turning now to FIG. 4, a sealed battery enclosure 400 with a piston system is depicted. The sealed battery enclosure 400 may be incorporated into any of the cell modules 18 depicted in FIG. 1. Similar to the enclosure 300 depicted in FIG. 3, the sealed battery enclosure 400 is shown to include both a main enclosure body 402 that defines a first battery volume 404 and an auxiliary enclosure body 414 that defines a second battery volume 424. The auxiliary enclosure body 414 is detachably coupled to the main enclosure body 402 using any suitable coupling mechanism. In this way, the auxiliary enclosure body 414 can be serviced or replaced in the event of an enclosure breach or component failure within the auxiliary enclosure body 414.

The auxiliary enclosure body 414 is shown to include a slidable piston 416 that is configured to move horizontally as indicated by the arrow 422. In an exemplary implementation, the piston 416 is generally disc-shaped, and an O-ring seal or gasket 430 may be situated around the circumference of the piston 416 to prevent the flow of air past the piston 416 and to provide a sealed volume for the battery cells. The piston 416 is coupled to a spring 418 that is configured to bias the piston 416 toward the main enclosure body 402 prior to operation of the battery cells and/or when the battery enclosure 400 is located in a cold or moderate temperature environment. As the cells heat up due to operation of the cells or an increase in environmental temperature, electrolysis gas 426 builds up within the main enclosure body 402. The electrolysis gas 426 compresses the spring 418, thus causing the piston 416 to slide outwardly and increase the sealed volume used to encapsulate the battery cells. Since the spring force provided by the spring 418 acts to bias the piston 416 toward the main enclosure body 402 and counteract the force exerted by the gas 426 on the piston 416, the spring constant, or stiffness associated with the spring 418 can have a significant effect on the internal pressure of the sealed battery volume. In other words, a spring 418 with a relatively high spring constant requires a greater force to be exerted by the gas 426 upon the piston 416 to compress the spring 418 and expand the volume available to the battery cells as compared with a relatively low spring constant.

As the piston 416 moves outwardly within the auxiliary enclosure body 414, the piston 416 displaces air 428 which is forced out of the enclosure body 414 through a vent opening 420. In an exemplary implementation, the vent opening 420 includes a membrane that permits air 428 to flow through the vent opening 420, but does not permit water to enter the auxiliary enclosure body 414.

Similar to the battery enclosure 300 depicted in FIG. 3, the sealed battery enclosure 400 is further shown to include a temperature sensor 406, a pressure sensor 408, a desiccant 410, and a pressure relieve valve 412. Each of these components may be identical or substantially similar to sensors 206, 208, desiccant 210, and pressure relief valve 212, depicted and described above with reference to FIG. 2. Although the desiccant 410 is shown to be positioned within the auxiliary enclosure body 414, in other implementations, the desiccant 410 may be located within the main enclosure body 402. In still further implementations, both the main enclosure body 402 and the auxiliary enclosure body 414 include a desiccant 410.

Figure 5:
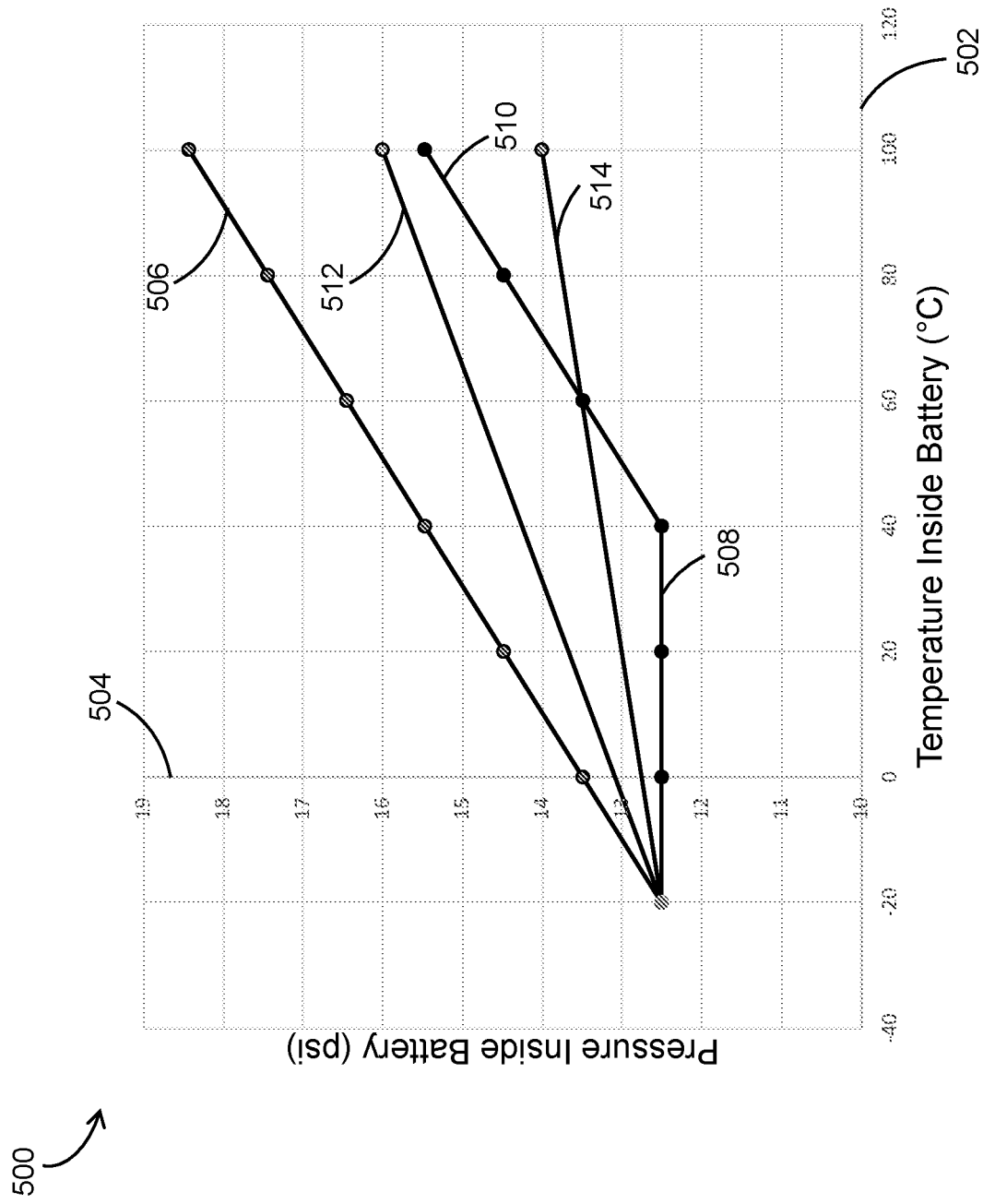
FIG. 5 is a plot depicting the correlations of pressure and temperature in the sealed battery enclosures depicted in FIGS. 2-4.

FIG. 5 depicts a plot 500 correlating ideal temperature and pressure data collected by the sensors (i.e., temperature sensors 206, 306, 406, pressure sensors 208, 308, 408) of the sealed battery enclosures 200, 300, 400. The horizontal axis 502 is shown to depict the temperature inside the sealed portions of the enclosures in degrees Celsius, while the vertical axis 504 is shown to depict the pressure inside the sealed portions of the enclosures in pound-force per square inch (psi).

Line 506 depicts the behavior of the battery enclosure 200, depicted in FIG. 2. At a minimum temperature of −20° C. inside the enclosure, the pressure inside the enclosure is at a minimum of approximately 12.5 psi. The data 506 exhibits a linear relationship up to a maximum temperature of 100° C. and a maximum pressure of approximately 18.5 psi Line segments 508 and 510 depict the behavior of the battery enclosure 300 with the bladder system, depicted in FIG. 3. Specifically, line segment 508 depicts the behavior of the enclosure 300 as the bladder 316 inflates, and line segment 510 depicts the behavior once the bladder 316 has fully expanded. As shown, during the period of bladder inflation, even though the temperature inside the enclosure is increasing (i.e., from −20° C. to 40° C.), the pressure inside the battery does not correspondingly increase and remains at the minimum of 12.5 psi. This is due to the increase in volume provided by the bladder 316 accommodating the expansion of the electrolysis gases 318 that would otherwise increase the pressure in the enclosure 300. However, once the bladder 316 has fully expanded, the electrolysis gases 318 continue to expand and increase the pressure within the enclosure 300 up to a maximum pressure of approximately 15.5 psi at the maximum temperature of 100° C.

As depicted in FIG. 5, during the period of pressure increase (depicted as line segment 510), the pressure within the enclosure 300 increases at approximately the same rate as the pressure within the enclosure 200 (depicted as line segment 506). Notably, the maximum pressure of the enclosure 300 is less than the maximum experienced by the enclosure 200, which does not include any pressure mitigation features. Detection of enclosure breaches within the enclosure 300 (described in further detail below with reference to FIG. 6) may occur during the period of pressure increase (depicted as line segment 510). For example, if a controller receiving pressure and temperature information from the sensors 306, 308 within the enclosure 300 determines that the temperature is above 40° C. and the pressure has not correspondingly risen above 12.5 psi, the controller may perform an enclosure breach mitigation action that includes displaying a warning on the display 40 (depicted in FIG. 1) and/or shutting the battery down.

Lines 512 and 514 depict the behavior of the battery enclosure with the piston system 400, depicted in FIG. 4. Specifically, line 512 depicts the battery enclosure 400 with a spring 418 having a relatively higher spring constant, and line 514 depicts the battery enclosure 400 with a spring 418 having a relatively lower spring constant. Accordingly, the enclosure 400 with the higher spring constant experiences a higher maximum pressure (approximately 16 psi), while the enclosure 400 with the lower spring constant experiences a lower maximum pressure (approximately 14 psi). Notably, both implementations of the enclosure 400 experience a lower maximum pressure than the enclosure 200, which includes no pressure mitigation features. Furthermore, in contrast to the enclosure 300 with the bladder system, the enclosure 400 with the piston system permits the detection of enclosure breaches across the entire temperature spectrum due to the expected linear correlation between pressure and temperature through the complete temperature range.

Figure 6:
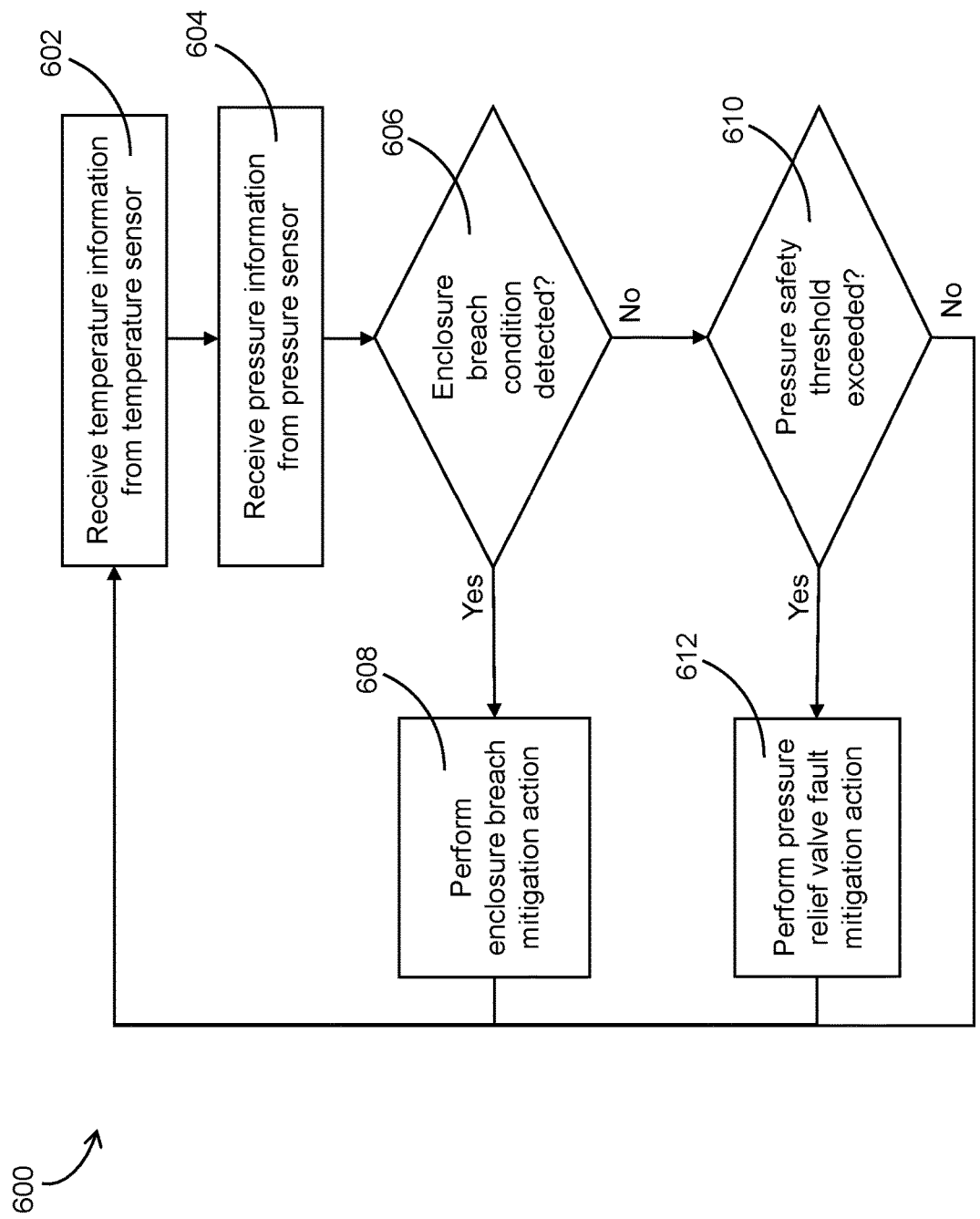
FIG. 6 is a flow chart of a process for detecting and mitigating enclosure breaches in the sealed battery enclosures depicted in FIGS. 2-4.

Referring now to FIG. 6, a process 600 is depicted for detecting enclosure breach or pressure relief valve fault conditions. According to an exemplary implementation of the present disclosure, process 600 may be performed at least in part by the BMS 60 or the central controller 12, depicted in FIG. 1. For the purposes of simplicity, process 600 will be described below exclusively with reference to the BMS 60.

Process 600 is shown to commence with step 602, in which the BMS 60 receives temperature information from a temperature sensor (e.g., temperature sensor 206, 306, 406). At step 604, the BMS 60 receives pressure information from a pressure sensor (e.g., pressure sensor 208, 308, 408). In some implementations, the BMS 60 receives the temperature information and the pressure information at specified intervals of time (e.g., one temperature measurement from the temperature sensor 206 and one pressure measurement from the pressure sensor 208 every five seconds). In other implementations, the BMS 60 receives pressure and temperature measurements from the sensors in a generally continuous manner.

At step 606, the BMS 60 determines whether an enclosure breach condition has occurred. As depicted in FIG. 5, in most circumstances, there is a positive linear correlation between pressure and temperature measurements for a properly sealed battery enclosure. (Note: the exception to this positive correlation is depicted herein by line segment 508 for the sealed battery enclosure 300, in which the period of inflation of the bladder 316 does not result in a corresponding increase in pressure during an increase in temperature.)

If, at step 606, the BMS 60 determines that the temperature and pressure information indicates that an enclosure breach condition has occurred, process 600 may proceed to step 608 and the BMS 60 may perform an enclosure breach mitigation action. Because an enclosure breach can result in water intrusion, which can in turn lead to a thermal runaway event, the present inventor has recognized the advantages of alerting a user to the existence of an enclosure breach prior to water intrusion. In some implementations, the enclosure breach mitigation action may include the BMS 60 transmitting a message (e.g., to central controller 12) to be displayed on a user device (e.g., display 40) indicating a battery enclosure breach. This message may prompt the user to inspect and service the battery, if possible. For example, user inspection of the battery may reveal that the enclosure breach has occurred within an auxiliary enclosure body, prompting the user to detach the auxiliary enclosure body for repair or complete replacement In further implementations, the BMS 60 may disconnect the affected battery from the power storage system 16. A severity of the enclosure breach may be determined based on an error between expected temperature and pressure values and the received temperature and pressure information. In some implementations, the BMS 60 performs both actions. Once the BMS 60 has performed the enclosure breach mitigation action or actions, process 600 reverts to step 602.

Returning to step 606, if the BMS 60 does not determine that the temperature and pressure information indicates that an enclosure breach condition has occurred, process 600 proceeds to step 610. At step 610, the BMS 60 determines whether a pressure safety threshold has been exceeded based on the pressure information received from the pressure sensor (e.g., pressure sensor 208, 308, 408). If a pressure safety threshold is exceeded within the battery enclosure, this may indicate a fault in the pressure relief valve (e.g., pressure relief valve 212, 312, 412), and the BMS 60 may perform a pressure relief valve fault mitigation action in step 612. In some implementations, the fault mitigation action may include the BMS 60 transmitting a message to be displayed on a user device (e.g., display 40) indicating a pressure relief valve fault. If the pressure information from the pressure sensor is sufficiently high to indicate imminent damage to the battery, the BMS 60 may disconnect the affected battery from the power storage system 16. Once the BMS 60 has performed the pressure relief valve fault mitigation action or actions, process 600 concludes by reverting to step 602, as the BMS 60 continues to receive pressure and temperature information from the temperature and pressure sensors.

Figure 7:
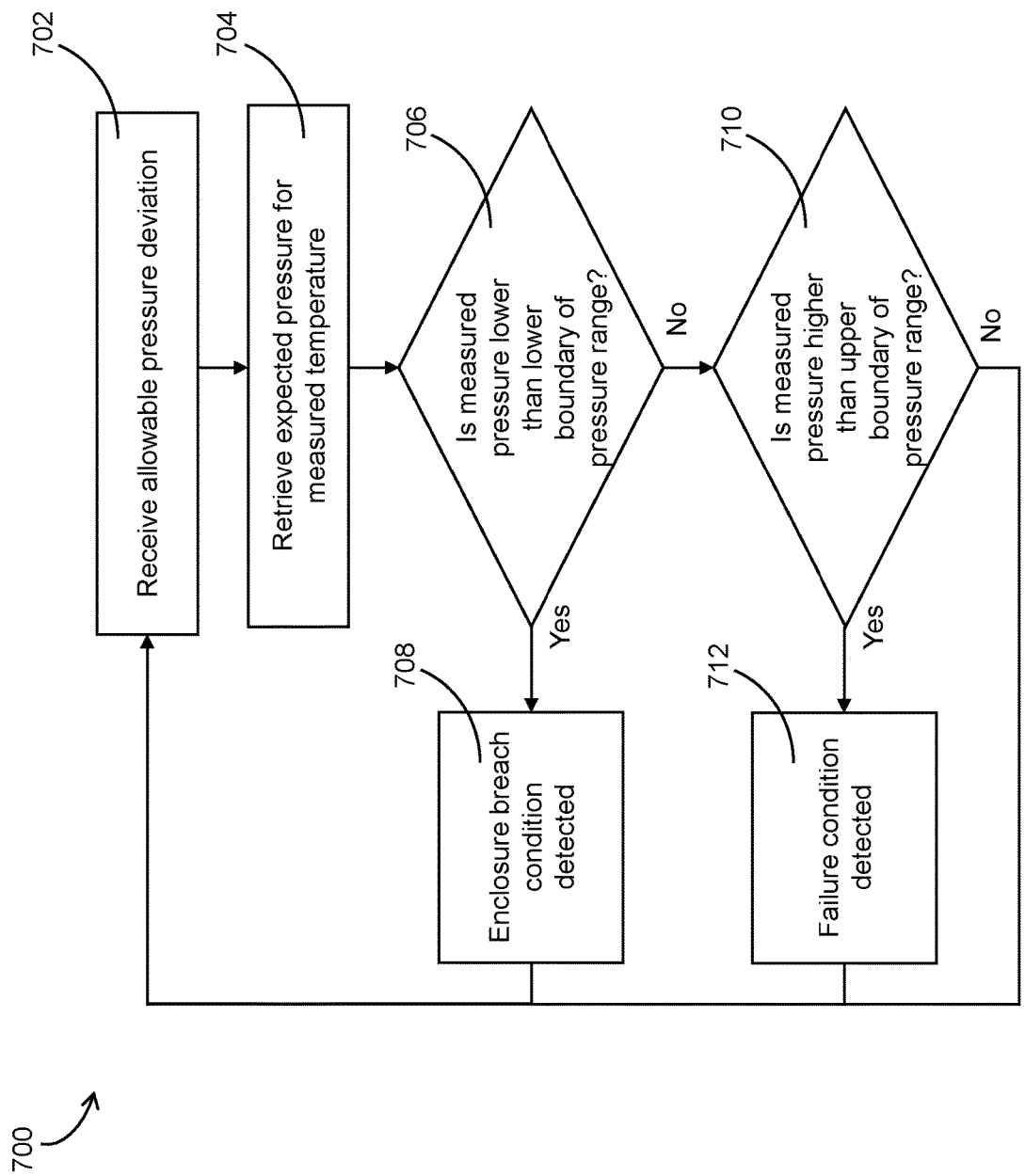
FIG. 7 is a flow chart of another process for detecting enclosure breaches in the sealed battery enclosures depicted in FIGS. 2-4.

Turning now to FIG. 7, a process 700 is depicted for detecting enclosure breaches or pressure relief valve fault conditions. In some implementations, process 700 is performed during step 606 of process 600 depicted in FIG. 6. According to an exemplary implementation of the present disclosure, process 700 may be performed at least in part by the BMS 60 or the central controller 12, depicted in FIG. 1. For the purposes of simplicity, process 700 will be described below exclusively with reference to the BMS 60.

Process 700 commences with step 702, in which the BMS 60 receives or retrieves an allowable pressure deviation. The allowable pressure deviation refers to amount in which a pressure measurement may deviate from an expected or ideal value for the given temperature (e.g., the data depicted in plot 500 of FIG. 5) before a fault is detected. The allowable pressure deviation may vary based on characteristics of the battery or may be configurable by an operator. In some implementations, the allowable pressure deviation is in the form of a pressure value, for example, ±0.5 psi or ±1.0 psi. In other implementations, the allowable pressure deviation is in the form of a percentage, for example, ±10% or ±15%.

At step 704, the BMS 60 retrieves the expected pressure measurement for the measured temperature value. The measured temperature value may be received from the temperature sensor (e.g., temperature sensor 206, 306, 406) at step 602 of process 600. The expected pressure measurement is based on the ideal data. For example, referring to FIG. 5, if the battery enclosure includes a bladder system (e.g., battery enclosure 300), and the temperature sensor 306 indicates that the measured temperature is 60° C., the expected pressure value is 13.5 psi. Accordingly, if the allowable pressure deviation is ±10%, the allowable pressure range is 12.15 psi to 14.85 psi.

At step 706, the BMS 60 determines whether the measured pressure is lower than the lower boundary of the expected range. The measured pressure value may be received from the pressure sensor (e.g., pressure sensor 208, 308, 408) at step 604 of process 600. Returning to the example above, step 706 is satisfied if the measured pressure value is less than 12.15 psi. Process 700 then proceeds to step 708, as an enclosure breach condition is detected. As described above with reference to step 608 of FIG. 6, detection of an enclosure breach condition may prompt the BMS 60 to perform an enclosure breach mitigation action.

If, at step 706, the BMS 60 determines that the measured pressure is not lower than the lower boundary of the pressure range, process 700 proceeds to step 710, in which the BMS 60 determines whether the measured pressure is higher than the upper boundary of the expected range. Returning to the example above, step 710 is satisfied if the measured pressure value is greater than 14.85 psi. Process 700 then proceeds to step 712, as a failure condition is detected. Examples of a fault condition in which a higher than expected measured pressure value is received may include a failure of the bladder 316 to properly inflate, or a failure of the piston 416 to slide within the auxiliary enclosure body 414. Alternatively, the high pressure may be caused by another failure mode. In response to detection of the fault condition at step 712, the BMS 60 may transmit a warning or failure alert message (e.g., to central controller 12) to be displayed on a user device (e.g., display 40) and/or may disconnect the affected battery from the power storage system 16. However, if the BMS 60 determines at step 710 that the measured pressure is not higher than the upper boundary of the pressure range, then the measured pressure is within the expected pressure range, and process 700 terminates by reverting to step 702.

In the present disclosure, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and devices. Various equivalents, alternatives and modifications are possible within the scope of the appended claims.

What is claimed is:

1. A marine battery system configured to provide energy to a marine vessel load, comprising:
   a main enclosure body;
   an auxiliary enclosure body coupled to the main enclosure body to define a sealed battery volume, the auxiliary enclosure body configured to perform a pressure accommodation action responsive to an increase in a temperature within the sealed battery volume;
   a battery disposed within the sealed battery volume;
   a temperature sensor configured to detect temperature within the sealed battery volume and a pressure sensor configured to detect pressure within the sealed battery volume;
   a controller configured to:
      receive temperature information from the temperature sensor and pressure information from the pressure sensor; and
      detect an enclosure breach, wherein the enclosure breach comprises an opening in the sealed battery volume, based only on a comparison of a current pressure and a current temperature within the sealed battery volume either to an expected pressure for the sealed battery volume at the current temperature or an expected temperature for the sealed battery volume at the current pressure, accounting for the pressure accommodation action.

2. The marine battery system of claim 1, wherein the pressure accommodation action comprises expansion of a bladder to expand the sealed battery volume.

3. The marine battery system of claim 2, wherein the bladder is disposed within the main enclosure body and the auxiliary enclosure body and wherein the bladder and the main enclosure body are configured to fully encapsulate the battery.

4. The marine battery system of claim 1, wherein the pressure accommodation action comprises sliding of a piston.

5. The marine battery system of claim 4, wherein the piston is coupled to a spring configured to be compressed by the sliding of the piston to expand the sealed battery volume.

6. The marine battery system of claim 1, wherein:
   the main enclosure body defines a first battery volume;
   the auxiliary enclosure body defines a second battery volume; and
   the sum of the first battery volume and the second battery volume comprises a maximum sealed battery volume.

7. The marine battery system of claim 1, wherein the controller is further configured to perform an enclosure breach mitigation action in response to detection of the enclosure breach.

8. The marine battery system of claim 1, wherein the auxiliary enclosure body is detachably coupled to the main enclosure body.

9. The marine battery system of claim 1, further comprising a desiccant disposed within the sealed battery volume.

10. The marine battery system of claim 1, further comprising a vent opening formed in a sidewall of the auxiliary enclosure body, wherein the vent opening is configured to facilitate expansion and contraction of the sealed battery volume.

11. The marine battery system of claim 10, wherein the vent opening comprises a membrane configured to permit a flow of air through the vent opening and prevent a flow of fluid through the vent opening.

12. The marine battery system of claim 1, further comprising a pressure relief valve configured to open when a pressure within the sealed battery volume exceeds a pressure safety threshold.

13. A marine battery system configured to provide energy to a marine vessel load, comprising:
   a battery;
   a main enclosure body;
   an auxiliary enclosure body that is detachably coupled to the main enclosure body; and
   wherein the battery is fully encapsulated within a sealed battery volume within the main enclosure body and the auxiliary enclosure body;
   wherein an increase in a temperature within the sealed battery volume causes the sealed battery volume to expand within the auxiliary enclosure body to compensate for an increase in a pressure within the sealed battery volume;
   a temperature sensor configured to detect temperature within the sealed battery volume and a pressure sensor configured to detect pressure within the sealed battery volume;
   a controller configured to:
      receive temperature information from the temperature sensor and pressure information from the pressure sensor; and detect an enclosure breach, wherein the enclosure breach comprises an opening in the sealed battery volume, based only on a comparison of a current pressure and a current temperature within the sealed battery volume either to an expected pressure for sealed battery volume at the current temperature or an expected temperature for the sealed battery volume at the current pressure, accounting for the pressure accommodation action.

14. The marine battery system of claim 13, further comprising:
a piston movable within the auxiliary enclosure body;
wherein the increase in a temperature within the sealed battery volume causes the piston to slide within the auxiliary enclosure body to expand the sealed battery volume.

15. The marine battery system of claim 13, further comprising:
a bladder disposed within the main enclosure body and the auxiliary enclosure body;
wherein the increase in a temperature within the sealed battery volume causes the bladder to expand within the auxiliary enclosure body to expand the sealed battery volume.

16. The marine battery system of claim 12, wherein the controller is further configured to detect the enclosure breach upon determining that an increase in the temperature information has not resulted in a corresponding increase in the pressure information.

* * * * *